United States Patent [19]
Beck et al.

[11] Patent Number: 5,547,649
[45] Date of Patent: Aug. 20, 1996

[54] HYDROGEN SULFIDE CONVERSION WITH NANOPHASE TITANIA

[75] Inventors: Donald D. Beck, Rochester Hills, Mich.; Richard W. Siegel, Hinsdale, Ill.

[73] Assignees: The United States of America as represented by the United States Department of Energy, Washington, D.C.; General Motors Corp., Detroit, Mich.

[21] Appl. No.: 125,884

[22] Filed: Sep. 23, 1993

[51] Int. Cl.$^6$ ................................................. B01D 53/52
[52] U.S. Cl. ............... 423/230; 423/244.06; 423/244.10; 423/573.1
[58] Field of Search .............................. 423/230, 244.06, 423/573.1

[56] References Cited

U.S. PATENT DOCUMENTS

| | | | |
|---|---|---|---|
| 4,115,523 | 9/1978 | Ratcliffe | 423/387 |
| 4,313,820 | 2/1982 | Farha, Jr. et al. | 208/213 |
| 4,371,507 | 2/1983 | Farha, Jr. et al. | 423/230 |
| 4,517,171 | 5/1985 | Ratcliffe | 423/648 R |
| 5,128,081 | 7/1992 | Siegal et al. | 264/81 |
| 5,223,186 | 6/1993 | Eastman et al. | 264/25 |
| 5,234,885 | 8/1993 | Mouri et al. | 502/405 |
| 5,326,737 | 7/1994 | Kay et al. | 502/400 |

OTHER PUBLICATIONS

"Basic College Chemistry" by Joseph A. Babor (1953)(no month) Thomas Y. Crowell company N.Y.; 2nd ed.; p. 256.

"Catalytic Reduction of CO with Hydrogen Sulfide. 2. Adsorption of $H_2O$ and $H_2S$ on Anatase and Rutile" D D Beck et al; J. Phys. Chem. 1986, vol. 90, No. 14 pp. 3123–3131 (no month).

Donald D. Beck et al., "The Decomposition of Hydrogen Sulfide Over Nanophase Titanium Dioxide", Exhibit A, GMR–7523, for presentation at American Vacuum Society 38th Annual Symposium, Applied Surface Science Session, Seattle, WA, Nov. 11–15, 1991.

Richard W. Siegel, "Nanostructured Materials", Exhibit B, Invited paper presented at the First Mexico–USA Symposium: The Frontiers in Materials Science, Ixtapa, Mexico, 24–27 Sep. 1991.

D. D. Beck et al., "Catalytic Reduction of CO with Hydrogen Sulfide. 2. Adsorption of $H_2O$ and $H_2S$ on Anatase and Rutile", The Journal of Physical Chemistry, 1986, 90, pp. 3123–3131. (no month).

D. D. Beck et al., "Catalytic Reduction of CO with Hydrogen Sulfide. #. Study of Adsorption of $O_2$, CO, and CO Coadsorbed with $H_2S$ on Anatase and Rutile Using Auger Electron Spectroscopy and Temperature–Programmed Desorption", The Journal of Physical Chemistry, 1986, 90, pp. 3132–3136. (no month).

D. D. Beck et al., "Catalytic Reduction of CO with Hydrogen Sulfide. 4. Temperature–Programmed Desorption of Methanethiol on Anatase, Rutile, and Sulfided Rutile", J. Phys. Chem., 1986, 90, 3137–3140. (no month).

B. Morosin et al., "Shock–Induced Irreversible Transformation of Titania", Chemical Physics Ltrs, vol. 112, No. 6, Dec. 28, 1984, pp./ 555–558.

*Primary Examiner*—Gary P. Straub
*Assistant Examiner*—Timothy C. Vanoy
*Attorney, Agent, or Firm*—Timothy Harney; Hugh Glenn; William R. Moser

[57] ABSTRACT

A process for disassociating $H_2S$ in a gaseous feed using an improved catalytic material in which the feed is contacted at a temperature of at least about 275° C. with a catalyst of rutile nanocrystalline titania having grain sizes in the range of from about 1 to about 100 nanometers. Other transition metal catalysts are disclosed, each of nanocrystalline material with grain sizes in the 1–100 nm range.

3 Claims, 5 Drawing Sheets

HYDROGEN SULFIDE CONVERSION WITH NANOPHASE TITANIA

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

Improvements in the design of three-way catalysts which are used to control vehicle emissions have led to the increased use of cerium oxide as an active component. One of the results of increasing the cerium oxide content has been the increased emission of $H_2S$ to undesirable levels. Government agencies at present do not regulate $H_2S$ emissions from vehicles, but unusually high $H_2S$ emission is considered to be undesirable, and in some cases has resulted in warranty replacement.

Several strategies have and continue to be employed to lower $H_2S$ emission to acceptable levels. The most effective of these strategies involves the incorporation of Ni in the catalyst which reacts with $H_2S$ in rich exhaust, storing sulfur as NiS and releases sulfur in lean exhaust as $SO_2$. The European Community has expressed concern about the use of Ni in automobile catalysts due to its toxicity, thus an alternative material having comparable activity is desired. Other strategies that have been proposed or demonstrated involve costly hardware additions, the use of other toxic materials, and treatments to the catalyst which have unknown effects on its durability.

This invention involves the improvement of activity of $TiO_2$ and $H_2S$ decomposition. The number of active surface sites can be increased by generating a high surface area rutile $TiO_2$ powder using a nanophase particle synthesis method. This form of nanophase $TiO_2$ as prepared is also deficient in oxygen, and thus contains a significant number of defect sites. The number of defect sites contributes to the high activity.

The technology involving the synthesis of nanophase particles is being evaluated as a way to synthesize precursor ceramic powders which can be pressure-molded to form ceramic parts having improved physical properties. This technology, however, has not yet been explored as a method for synthesizing catalytic materials.

DESCRIPTION OF INVENTION

Nanophase particles are synthesized by condensation of evaporated atoms in a controlled environment. The resulting condensed particles are typically extremely small, on the order of 1 to 100 nm preferably 2 to 20 nm, and have a very narrow particle size distribution, as described in U.S. Pat. No. 5,128,081 issued Jul. 7, 1992 to Siegel et al., the disclosure of which is incorporated herein by reference. The use of rutile $TiO_2$ as a catalyst in the synthesis of hydrogen and methane from $H_2S$ and CO was disclosed in U.S. Pat. No. 4,517,171 issued May 14, 1985; however, no suggestion of nanophase material is contained therein, nor is there a suggestion therein of the role that oxygen deficiencies play in the catalyst activity, as will be explained hereafter.

In the present invention, nanophase particle synthesis has been employed to make high surface area rutile $TiO_2$ which is either crystalline or amorphous or mixtures thereof. The activity of this type of $TiO_2$ material was evaluated using a laboratory microreactor equipped with an atmospheric sampling mass spectrometer. A number of other commercially produced $TiO_2$ compounds were evaluated for comparison as shown in Table 1. The results from this study show that nanophase particle rutile $TiO_2$ dissociates $H_2S$ in a $H_2$-rich feedstream at a dramatically faster initial rate than all other $TiO_2$ catalysts tested. The amount of $H_2S$ which can be dissociated in a steady-state over a period of several hours is also much greater than with other forms of $TiO_2$ tested.

TABLE 1

Summary of Materials Studied

| Sample | Description | Composition (phase) | Surface Area $m^2/g$ |
|---|---|---|---|
| A | Nanophase $TiO_2$ | >95% rutile | 76 |
| B | Degussa P25 | 75% anatase | 61 |
| C | Degussa P25, calcined | >95% rutile | 2.4 |
| D | $Ti(OC_3H_7O)_4$, calcined | >95% anatase | 30 |
| E | $TiCl_4$, calcined | >95% rutile | 20 |
| F | Alumina | theta | 110 |

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION $H_2S$ decomposition activity of nanophase powder $TiO_2$ was compared with the activities of several forms of commercially available $TiO_2$ using a laboratory reactor. Each material was exposed to a feedstream containing 1 volume percent $H_2$ and 5 volume percent $H_2S$ in $N_2$ at 500° C. for various exposure times up to 7 hours. FIG. 1 shows the amount of sulfur stored per gram of catalyst as a function of exposure time for all catalysts studied. The initial reaction rate per gram of catalyst was extracted from the data in FIG. 1 and is shown in FIG. 2 as $H_2S$ molecules dissociated per gram of $TiO_2$ per second. The initial rate of sulfur storage of nanophase $TiO_2$ was at least a factor of 6 greater than the most active of the other materials tested. Although the reactivity of the nanophase material decreased from its high initial value with increased exposure to the feed, $H_2S$ decomposition continued on this material, but at a reduced rate. In contrast, the other $TiO_2$ materials tested showed little or no reactivity for sulfur removal following the initial 2–3 hour exposure to the feedstream. High surface area $Al_2O_3$ was also tested and showed virtually no reactivity for $H_2S$ decomposition.

Figure 3:
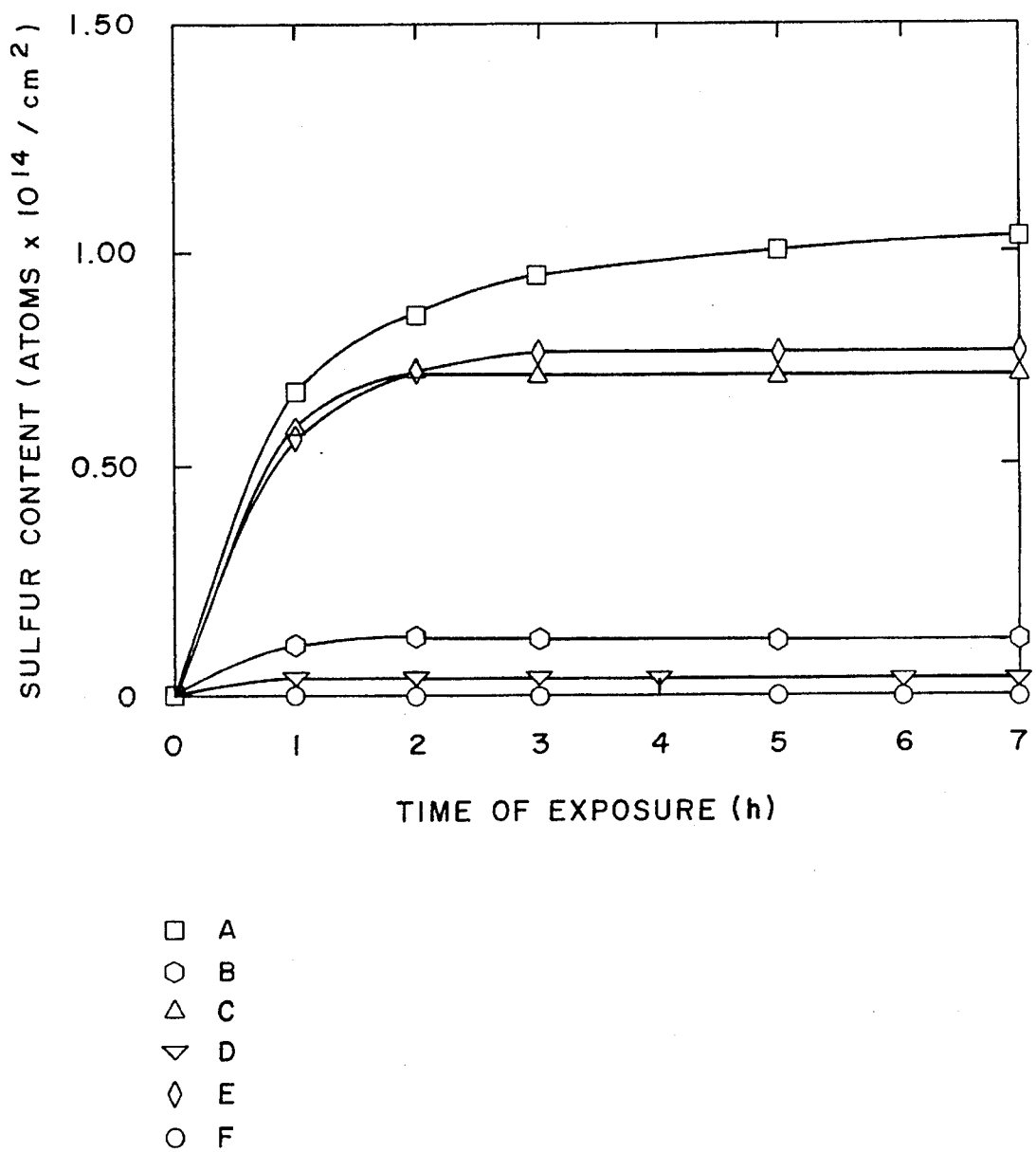
FIG. 3 is a graph illustrating the comparison of specific activities for various materials for $H_2S$ decomposition as a function of exposure time at 500° C.

The specific activity of each material was also obtained using the constant gas flow data and shown in FIG. 3. These results are expressed in terms of $H_2S$ molecules dissociated per $cm^2$ of surface area as a function of exposure time in the feedstream. The initial specific rates of all rutile $TiO_2$ materials were comparable and significantly greater than the anatase $TiO_2$ materials and the $Al_2O_3$. These observations suggest the most active sites for this reaction are contained on the surfaces of rutile phase material. This is consistent with previous reports identifying rutile as the most active surface phase for this reaction. The initial reaction turnover frequencies, defined as the number of $H_2S$ molecules dissociatively adsorbed on a unit surface area (1 $cm^2$) of the $TiO_2$ per second, are listed in tabular form in Table 2.

TABLE 2

Initial Turnover Frequency of Materials Studied

| Sample | Description | Initial Turnover Frequency (molecule/$cm^2$*sec) |
| --- | --- | --- |
| A | Nanophase $TiO_2$ | $2.68 \times 10^{10}$ |
| B | Degussa P25 | $5.08 \times 10^9$ |
| C | Degussa P25, calcined | $2.31 \times 10^{10}$ |
| D | $Ti(OC_3H_7O)_4$, calcined | $1.04 \times 10^9$ |
| E | $TiCl_4$, calcined | $2.64 \times 10^{10}$ |
| F | Alumina | |

Figure 1:
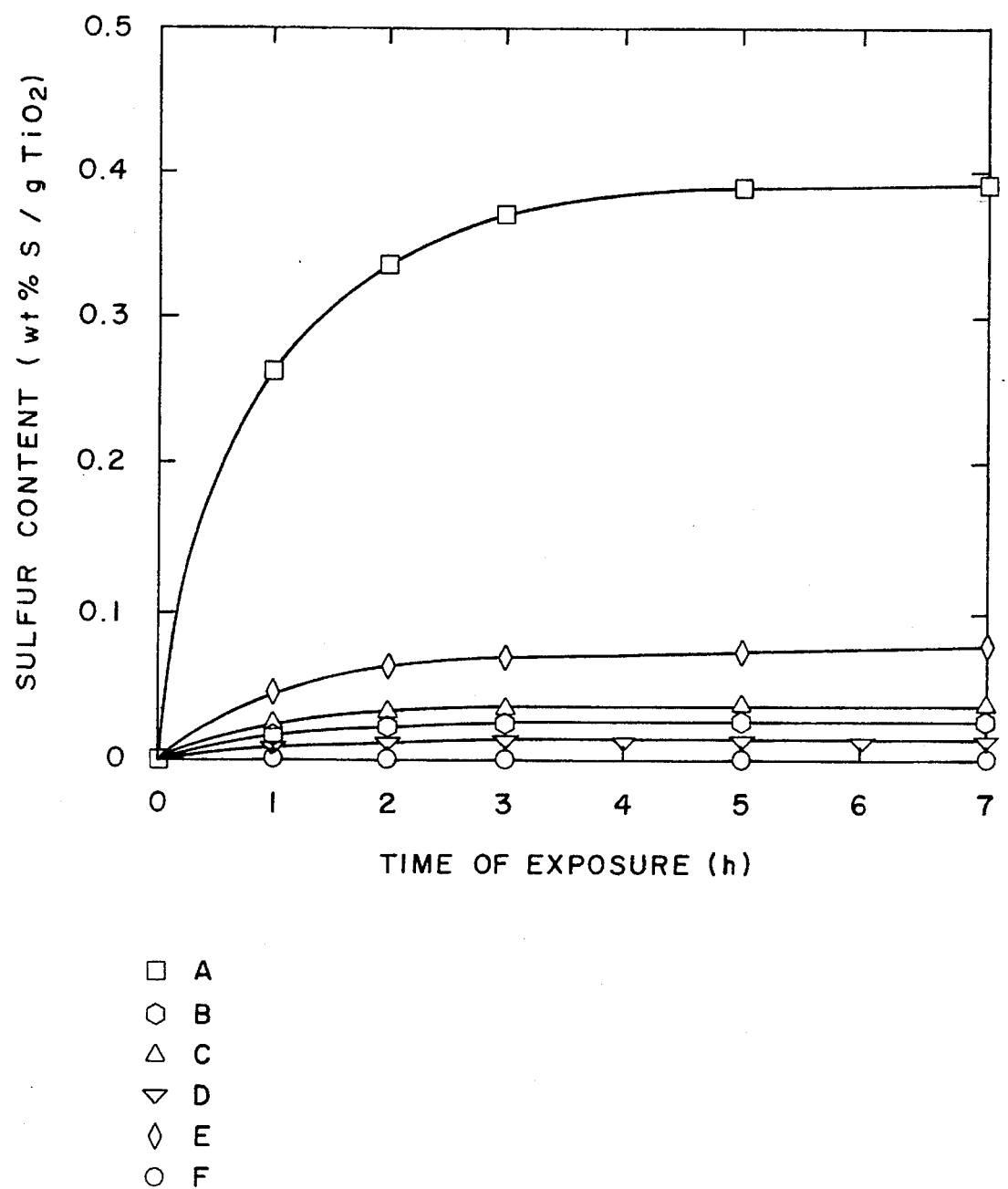
FIG. 1 is a graph illustrating the comparison of the activities for various materials for $H_2S$ decomposition as a function of exposure time at 500° C.
Figure 2:
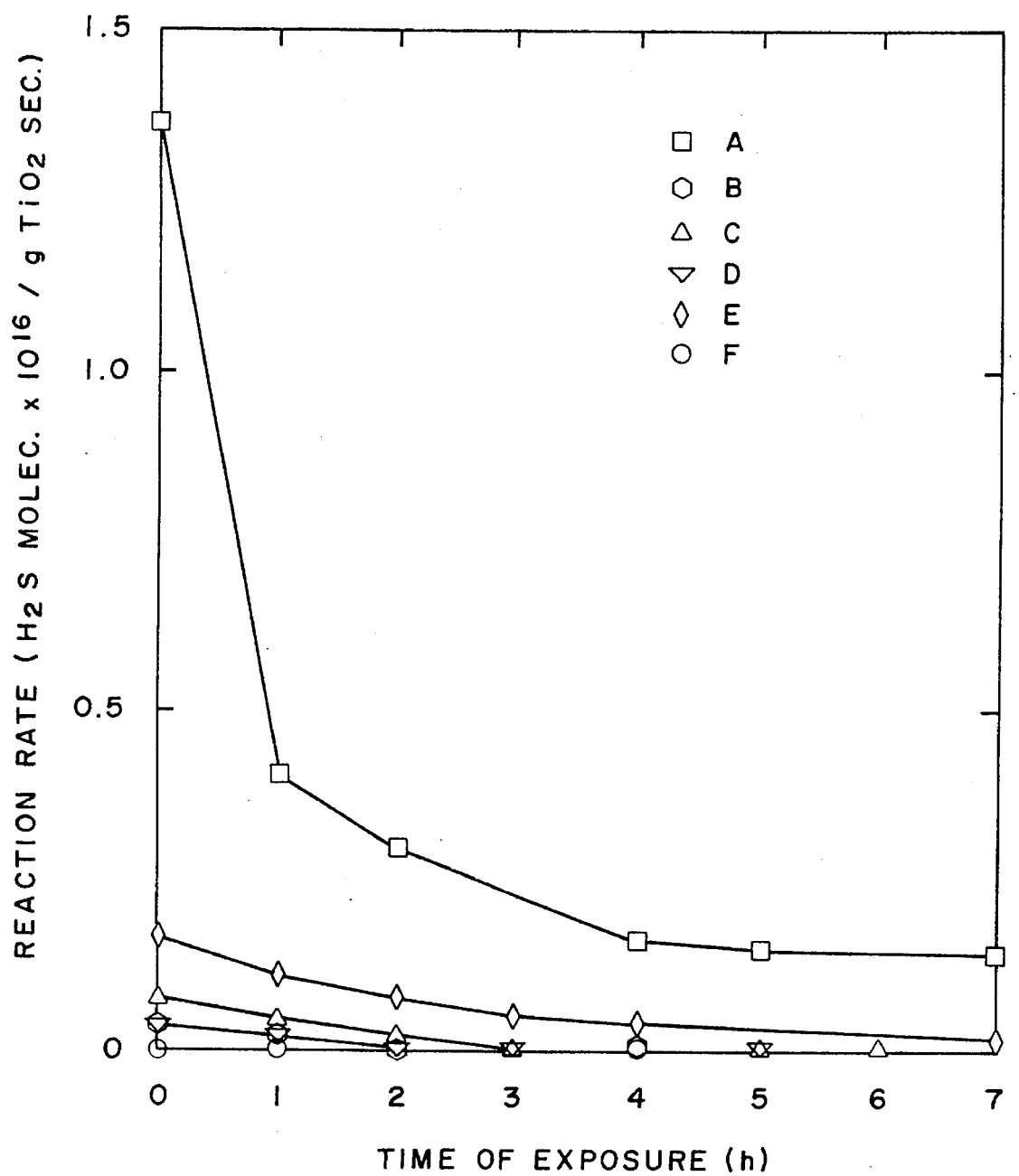
FIG. 2 is a graph illustrating the comparison of reaction rates for various materials for $H_2S$ decomposition as a function of exposure time at 500° C.
Figure 4:
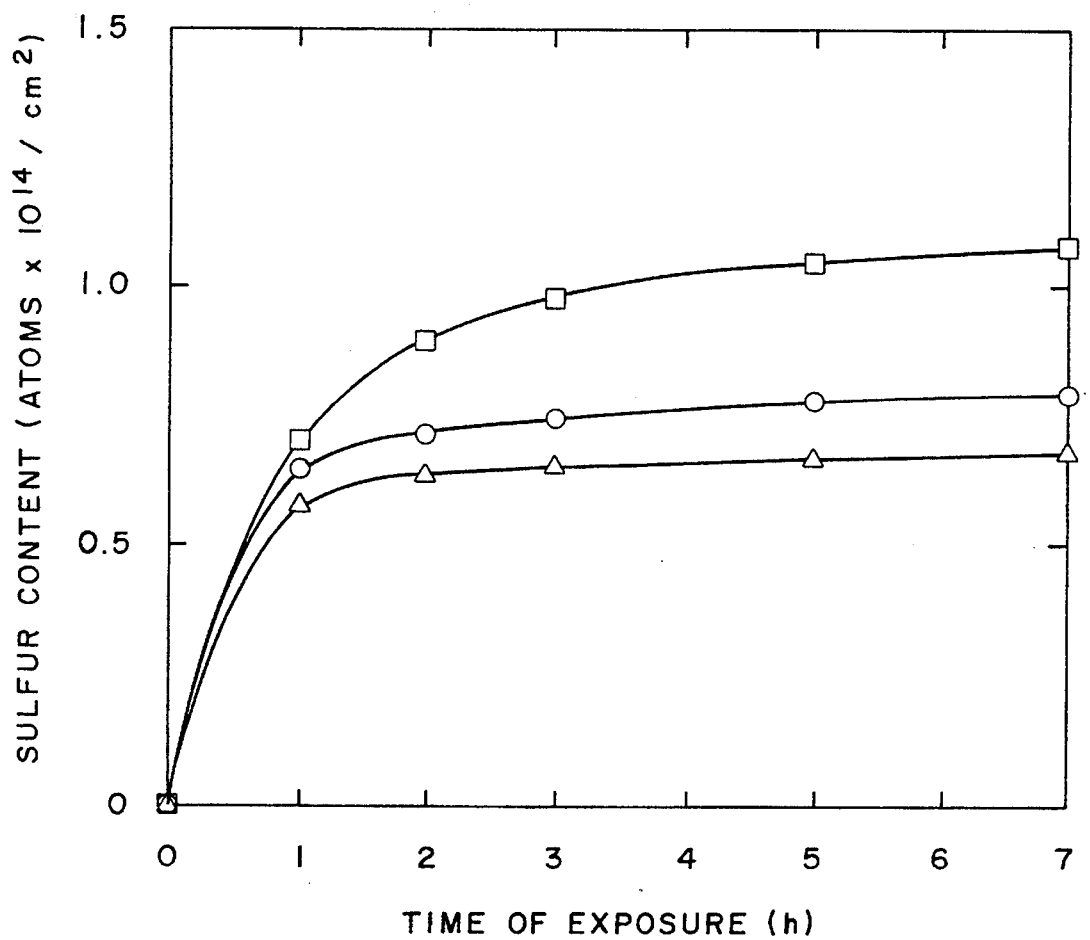
FIG. 4. is a graph illustrating the comparison of the specific activities for untreated material and for material annealed in 5% $O_2/N_2$ at 875° C. for 10 mins. and then for one hour.

Closer examination of the data in FIGS. 2 and 3 shows that after extended exposure time in the feedstream, the $H_2S$ decomposition rate decreases to near zero for all materials tested except for the nanophase $TiO_2$. The distinction between long-term activities of these materials can be attributed to differences in their physical properties, and specifically to the presence of lattice defects or vacancies. In previous work, it has been shown that the nanophase material is deficient in oxygen by as much as 5%. It has also been demonstrated that annealing in $O_2$ removes most of the oxygen deficiencies, resulting in near stoichiometric $TiO_2$. To test the effect of oxygen annealing on activity, the nanophase $TiO_2$ was treated in 5% $O_2/N_2$ at 800° C. for 10 minutes and then for 1 hour. The specific activities of the treated nanophase $TiO_2$ samples were obtained and compared to that of the untreated nanophase material and shown in FIG. 4. Focusing on the longer term reactivity, the annealed was less reactive than the untreated material. In fact, the annealed samples showed virtually no reactivity after the initial 2 hour exposure to the feedstream, unlike the non-annealed sample. This result suggests that oxygen vacancies are involved in sustaining reactivity of the as-produced nanophase $TiO_2$.

Figure 5:
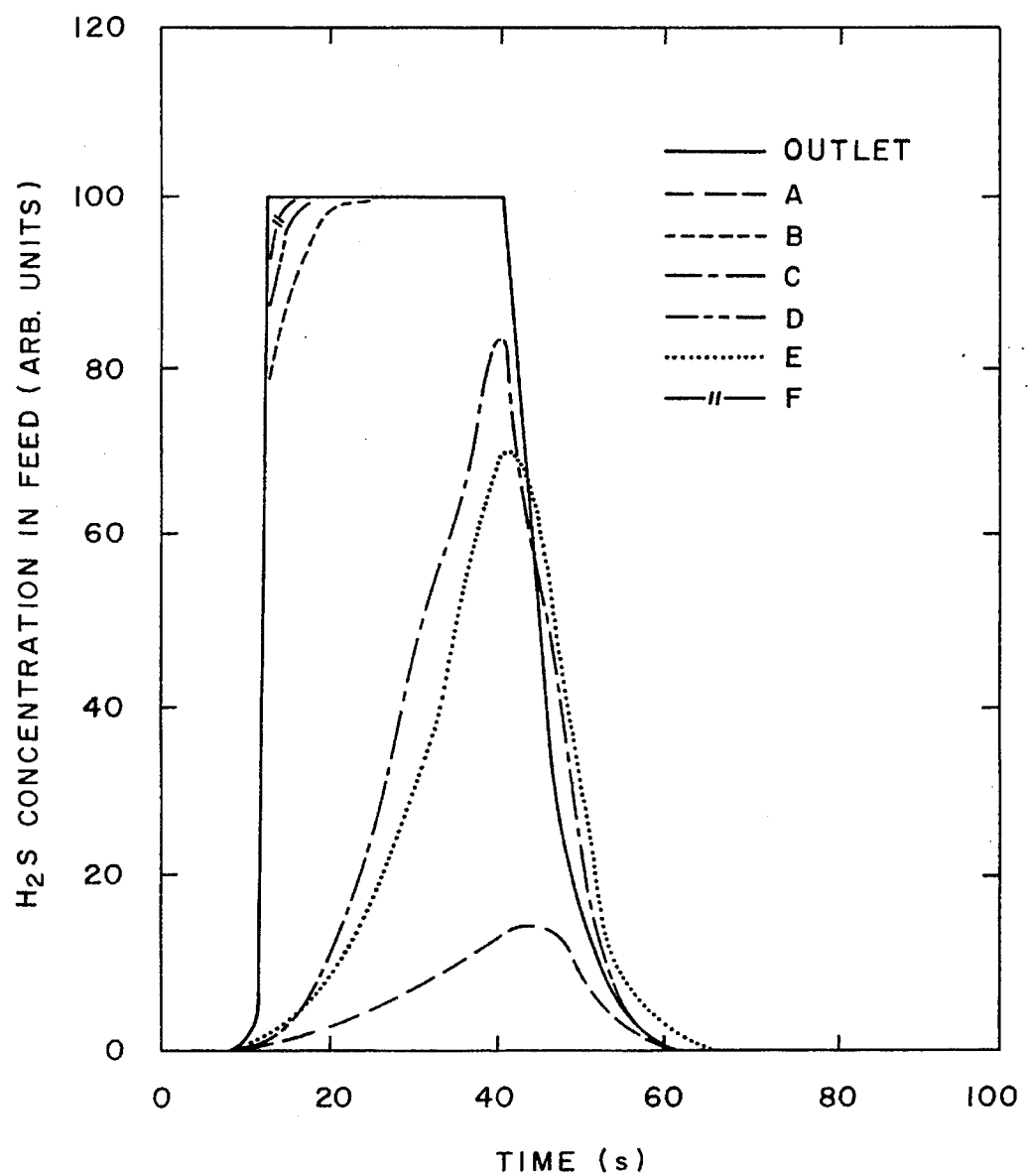
FIG. 5 is a graph illustrating the response of various materials exposed to a 30 s pulse of 1% $H_2S$ and 5% $H_2$ in a $N_2$ feedstream at 500° C.

A pulse experiment was also conducted and the result is shown in FIG. 5. In this experiment, each of the catalyst samples was treated in $N_2$ for a period of 30 minutes at 500° C., and near the end of this treatment, 5% $H_2$ and 1% $H_2S$ was added to the feedstream for a duration of 30 seconds and then withdrawn. The $H_2S$ concentration was measured using the atmospheric sampling mass spectrometer upstream with respect to the catalyst (designated "inlet"). In a repeat of the test, the $H_2S$ concentration was measured in the gas stream downstream from the catalyst (designated "outlet"). The activity for reaction with the $H_2S$ in the pulse was greater for the nanophase $TiO_2$ than the other forms of $TiO_2$ tested.

This work demonstrates the activity of $TiO_2$ for $H_2S$ decomposition is improved by using nanophase rutile $TiO_2$ as a catalyst.

The nanophase materials of the type hereinbefore set forth are improved catalysts. The nanophase materials should have grain sizes in the range of from about 1 to about 100 nanometers, preferably in the range of 2–20 nanometers. For the rutile titania, it has been found that the presence of oxygen deficiency sites substantially improves the catalytic activity. More preferably, the oxygen deficiency should extend from slightly under stoichiometric ratios to about 1.85 moles of oxygen for each mole of titanium.

The invention, as previously described, really pertains to improvement in catalytic material as opposed to providing catalytic properties where none previously existed. This invention demonstrates the extent to which nanophase material having grain sizes in the 1–100 nanometer range provide unexpectedly improved catalytic activity for previously known catalysts, such as the transition metals and compounds thereof, such as Ti, VV, Cr, Mn, Fe, Co, Ni, Cu and Zn as well as mixtures or alloys thereof and their compounds like oxides, nitrides and carbides. In addition, Zr, Mo, Ru, or Rh, Pd, Ag, Re, Os and their compounds which have previously demonstrated catalytic activity should show improved activity if made from nanophase materials having grain sizes in the 1–100 nm range, preferably 2–20 nm. Reiterating, the invention is not only in the discovery of new catalyst phase but also as it resides in the improvement in catalytic activity of known catalysts.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A process for disassociating $H_2S$ in a gaseous feed, comprising contacting said feed at a temperature of at least about 275° C. with a catalyst of rutile nanophase titania having grain sizes in the range of from about 1 to about 100 nanometers, said rutile nanophase titania is a catalyst having a surface area of 76 $m^2/g$ and a stoichiometric oxygen deficiency characterized by an oxygen to titanium molar ratio in the range of from about 1.85 to 1.

2. The process of claim 1, wherein the $H_2S$ is present in a nitrogen stream.

3. A process for disassociating $H_2S$ in a gaseous feed, comprising contacting said feed at a temperature of at least about 275° C. with a nanophase titania catalyst having grain size in the range of from about 1 to about 100 nanometers, said nanophase titania catalyst having a surface area of 76 $m^2/g$ and a stoichiometric oxygen deficiency characterized by an oxygen to titanium molar ratio less than the stoichiometric ratios.

* * * * *